Figure 1:
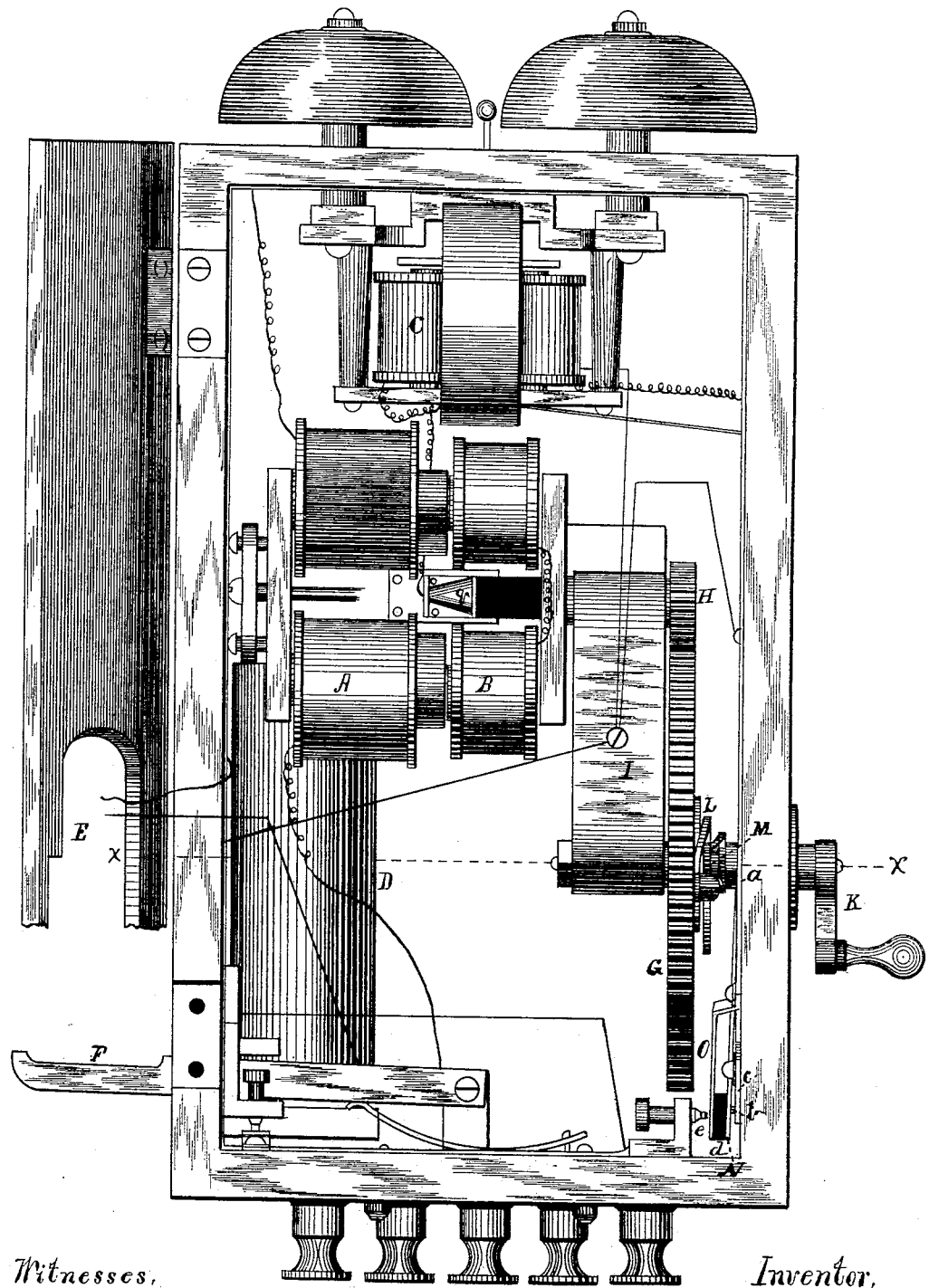

(No Model.) 4 Sheets—Sheet 1.

E. GRAY.
SIGNALING DYNAMO ELECTRIC MACHINE.

No. 394,172. Patented Dec. 11, 1888.

Witnesses,
William S. Granger
William Forrist.

Inventor,
Elisha Gray.
By George P. Barton
Attorney.

(No Model.) 4 Sheets—Sheet 2.

E. GRAY.
SIGNALING DYNAMO ELECTRIC MACHINE.

No. 394,172. Patented Dec. 11, 1888.

Witnesses
William S. Granger,
William Forest.

Inventor,
Elisha Gray.
By George P. Barton.
Attorney.

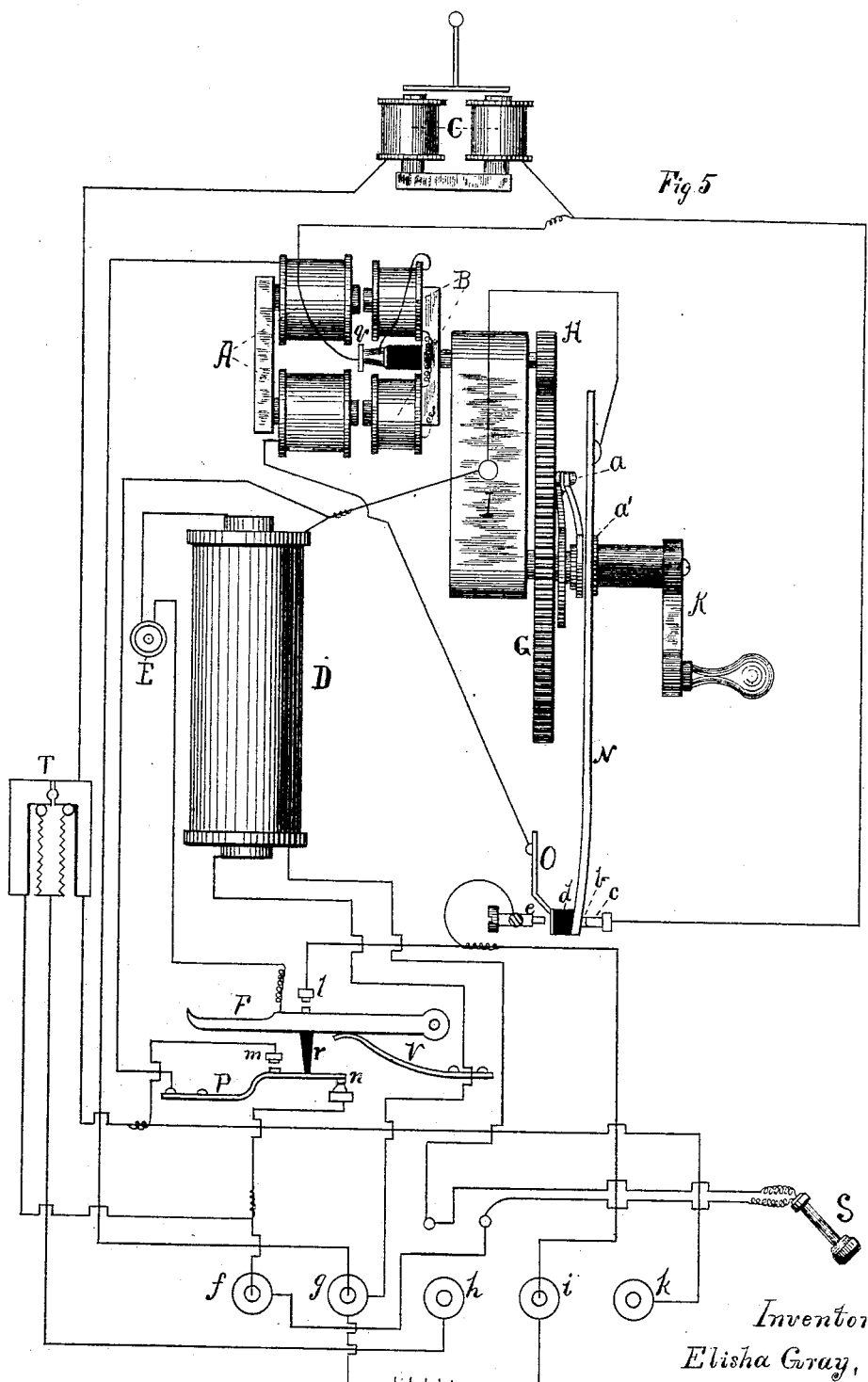

(No Model.)  4 Sheets—Sheet 4.

E. GRAY.
SIGNALING DYNAMO ELECTRIC MACHINE.

No. 394,172. Patented Dec. 11, 1888.

Witnesses:
Chas. G. Hawley.
Chas. C. Woodworth.

Inventor:
Elisha Gray,
By George P. Barton
Attorney.

UNITED STATES PATENT OFFICE.

ELISHA GRAY, OF HIGHLAND PARK, ASSIGNOR TO THE WESTERN ELECTRIC COMPANY, OF CHICAGO, ILLINOIS.

SIGNALING DYNAMO-ELECTRIC MACHINE.

SPECIFICATION forming part of Letters Patent No. 394,172, dated December 11, 1888.

Original application filed January 3, 1881, Serial No. 23,331. Divided and this application filed May 11, 1881. Serial No. 33,046.

(No model.)

*To all whom it may concern:*

Be it known that I, ELISHA GRAY, of Highland Park, in the county of Lake and State of Illinois, have discovered certain new and useful Improvements in Dynamo or Magneto Electric Machines, of which the following is a specification.

My invention is designed more especially for use in telephone call boxes or generators used for transmitting signal-currents over telephone-lines.

The telephone call-box in use prior to my invention contained a permanent magnet in combination with an electro-magnet, which, when revolved with its poles in the magnetic field of the permanent magnet, generated electric currents for signaling. In another form of electro-magnet the armature, instead of being revolved, was torn forcibly away from the poles of the permanent magnet, and when released was drawn back by the permanent magnet. In both instances the shunt around the electro-magnet or armature was held open while the box was being used for signaling by means of a push-button connected with a key or circuit-changer in the shunt around the armature.

My invention relates to substituting for the permanent magnet an electro-magnet charged with the local battery made common to the transmitter and the said electro-magnet.

My invention also relates to an automatic shunting device for changing the circuit of the stationary electro-magnet and the revolving electro-magnet.

This application is filed as a division of an application, Serial No. 23,331, filed January 3, 1881, upon which Letters Patent No. 309,617 were granted December 23, 1884. In said patent I have claimed means for automatically breaking the shunt-circuit upon and continuously during the operation of the machine; also, the combination of the driving-shaft of a dynamo or magneto electric machine, a sleeve mounted thereon in such manner as to have a determinate longitudinal movement thereon, and a circuit-breaker automatically operated by the longitudinal movement of the sleeve.

My invention herein consists in the field or exciting electro-magnets, a battery normally in open circuit therewith, a crank or like actuating device for operating the said machine, and a circuit-controller for governing the circuit of said battery and actuated by the movement of the said crank device to close the same, and thereupon to energize the exciting-magnets while the machine is in operation.

My invention also consists in the means for automatically reopening the local battery-circuit when the machine is not in operation.

My invention further consists in a dynamo or magneto electric machine having field-magnets and a battery normally in open circuit with said magnets, and an actuating device for revolving the armature of said machine, means operated by the said actuating device for closing the said battery-circuit, a shunt or short circuit around the machine, and means for automatically opening said short circuit while the battery-circuit is closed through the said electro-magnets.

My invention is illustrated in the accompanying drawings, in which—

Figure 2:
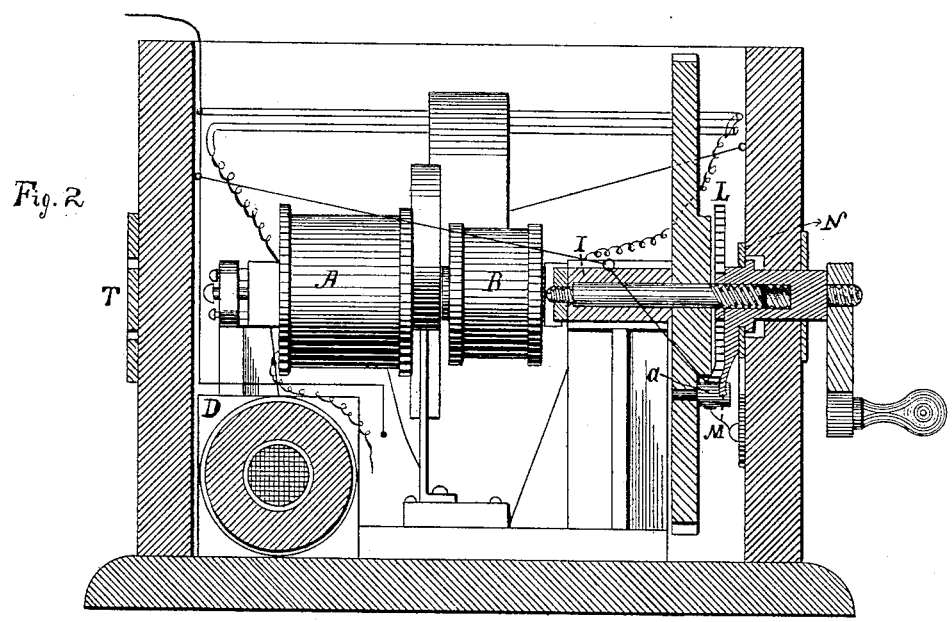
Figures 3, 4:
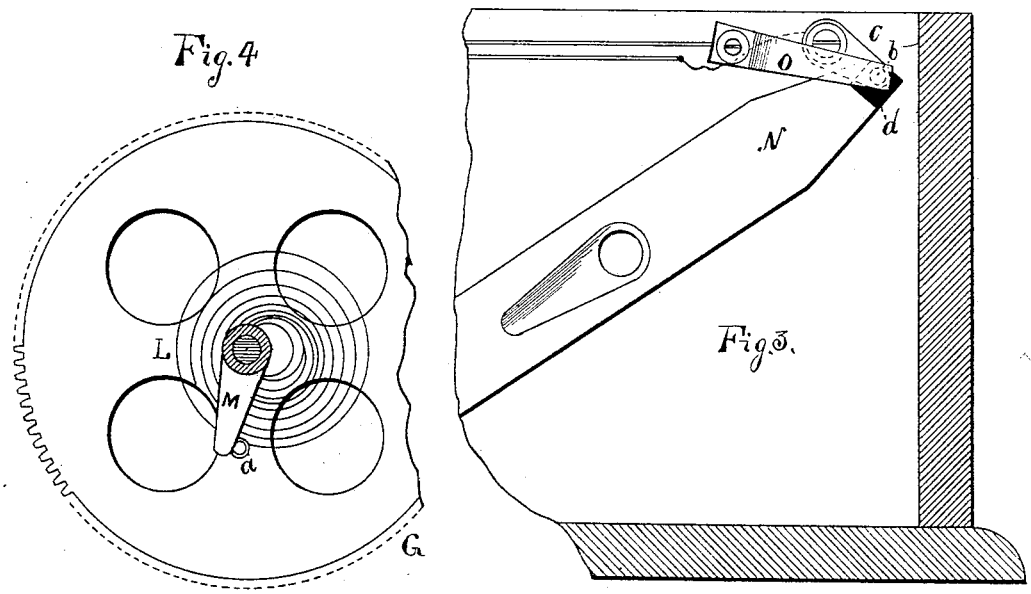
Figure 6:
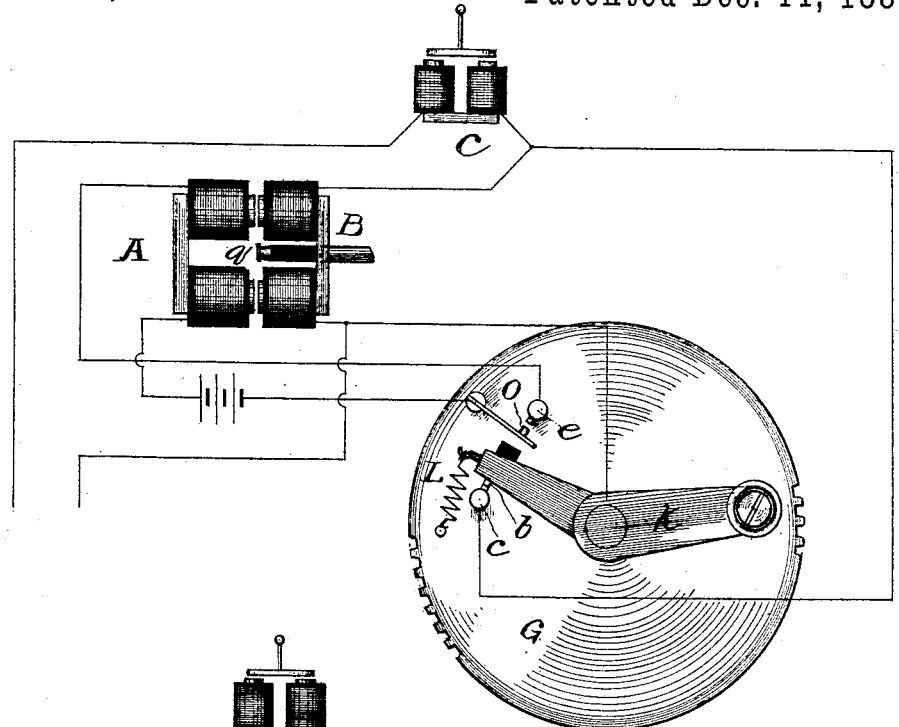
Figure 7:
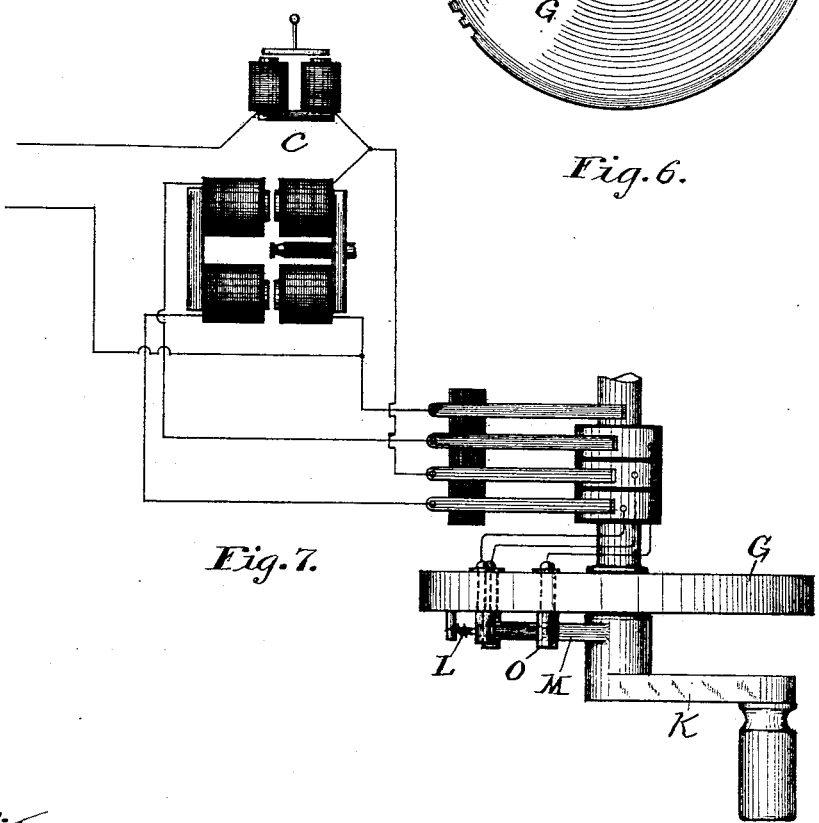

Figure 1, Sheet 1, is a front elevation of a telephone call-box embodying my improvements. Fig. 2, Sheet 2, is a transverse sectional view thereof upon line $x\ x$ of Fig. 1. Fig. 3 is a detailed view of the flat spring or switch. Fig. 4 is a detailed elevation of the large gear-wheel, the coiled spring, and arm. Fig. 5, Sheet 3, is a diagram of the connections and circuits. In Fig. 6, Sheet 4, I have shown a side elevation of a portion of the interior mechanism of the box in connection with the circuits, the device for changing the circuits being somewhat different from those shown in the preceding figures. In Fig. 7 I have shown a plan of the crank and circuit-changing mechanism and the circuits illustrated in Fig. 6.

Like parts are indicated by similar letters of reference in the different figures.

The exciting electro-magnet A is included in the local battery-circuit, its poles being presented to the poles of the armature or revolving electro-magnet B, which is included in the main circuit. Bell C is placed in the circuit in the usual manner. The usual induction-coil, D, is shown with its primary coil in the local circuit of the transmitter E. The telephone-switch F is of the gravity type. The gear-wheel G and the pinion-wheel H are supported upon the frame I. To the hub of crank K is attached the arm M, which is held normally against stop $a$ by the spring L in the position shown in Fig. 4. The contact-point $b$ of the flat spring or switch N normally rests against a metallic plate or contact, $c$, of the shunt-circuit. The contact-spring or connection O is insulated from spring N by rubber $d$. One end of spring O may be secured rigidly to the box, while its other end rests upon insulating-block $d$. When spring O is forced against contact $e$, the local circuit is closed through the stationary electro-magnet A.

It will be observed that the auxiliary contact-spring P is insulated from the switch-lever, the stud $r$ being of rubber. The inner end of the hub of the crank is provided with a thread which turns upon the end of the shaft of the gear-wheel G during the time the crank is being turned through one revolution, or, rather, during the time that arm M is being carried from one side of stop $a$ to the other side of said stop. This sleeve or hub of the crank is during this portion of the first revolution carried inwardly by the action of the screw provided upon the shaft of the wheel G, the amount of longitudinal movement it has communicated being determined by the pitch of the screw.

The switch N rests against the collar $a'$, which is provided upon the sleeve or crank, and when the actuating device or crank is first set in motion, and during the time the sleeve is turning upon the screw on the shaft of the large gear-wheel, the flat spring or switch N is pressed upon by said stop or collar $a'$, and thus moved inwardly, so as to separate contact $b$ from point $c$, thus opening the shunt-circuit, while at the same time the spring or circuit-closer O is carried against contact-point $e$. The shunt of the revolving armature B is thus opened at point $b$ at the same time the circuit of the local battery R is closed through stationary or exciting electro-magnet A.

The connections and circuits are illustrated somewhat in detail in Fig. 5. The binding-posts $f\ g\ h\ i\ k$ are for the line and ground connections. Binding-posts $f$ and $k$ are for the line out and line in, respectively. Post $h$ is for the ground-connection of the lightning-arrester T. Posts $g$ and $i$ are for the battery-connections. The contact-points $l\ m\ n$ of the switch F are so arranged that when the receiving-telephone S is hung on the switch its weight will bring the switch-lever down against the tension of spring $v$, thus breaking contact at points $l$ and $m$, while a new contact is made at the point $n$, as shown in Fig. 5. The circuit of the main line is thus closed through the bell C. The shunt of low resistance around the revolving armature is also closed while the circuit of the local battery is opened.

The circuit of the main line may be traced from the binding-post $k$ to the right plate of the lightning-arrester T, thence through the magnets of bell C to metallic plate or contact $c$, and thence by switch N to metallic supporting-frame I, thence to auxiliary spring P, thence to contact-point $n$, and thence to the binding-post $f$, as shown. The circuit of the telephone-line is thus normally closed through the coils of the magnets of the bell C. When the crank is turned as before described contact is broken between contacts $b\ c$. The currents generated in the coils of electro-magnet B will thus find circuit at one end through stop $q$, the electro-magnets of the bell C, and the binding-post K, and in the other direction through metallic supporting-frame I and thence to auxiliary spring P, and thence through contact-point $n$ to binding-post $f$, and thence to line out. Thus when the crank K is in motion the revolving armature is included in circuit with the bell-magnets in the main circuit, while the current of the local battery is directed through the exciting electro-magnets A.

The circuit of the local battery through the stationary or exciting electro-magnets may be traced from the negative pole of battery R to binding-post $i$; thence to contact-point $e$, and thence to contact-spring O, and thence, as shown, through the coils of electro-magnets A, and thence to binding-post $g$, which is connected with the positive pole of the battery. When the receiver S is removed from the hook, the circuit of the local battery is closed through the primary of the induction-coil, while the main circuit or telephone-line circuit is directed through the receiving-telephone S and the secondary coil of the induction-coil D, the bell-magnet C being at the same time shunted by the cut-out, as shown.

It is evident that the exciting electro-magnet and the automatic devices for closing the local battery through the same may be used apart from the automatic shunt-opening mechanism. I preferably, however, combine the two features in the same apparatus, as herein specified.

In the modification shown in Figs. 6 and 7 the contact $b$ is provided upon arm M. This contact $b$ is held against contact $c$ of the shunt-circuit by means of the spring L. When the crank is turned, the shunt-circuit is opened at $c$, while the insulation $d$ on arm M, coming against contact-spring O, forces said contact-spring O against the contact $e$, thus closing the circuit of the local battery through the exciting electro-magnet A.

In the dynamo-electric machine herein described the exciting electro-magnet is stationary. It is evident, however, that it is immaterial which of the electro-magnets is revolved, since it has been common to revolve either one or the other in this class of machines. There are various other modifications which would

Having thus described my invention, I claim as new and desire to secure by Letters Patent—

1. The combination, substantially as hereinbefore set forth, with the local battery, of the exciting electro-magnet of the dynamo-electric machine and the crank device for operating said machine, and a switch which is moved by the crank device as the crank device is set in motion, whereby the battery-circuit is closed automatically through the said exciting electro-magnet and held closed while the machine is in operation.

2. In a dynamo or magneto electric machine, the combination, substantially as hereinbefore described, of the field or exciting magnets thereof, a battery normally in open circuit with the said magnets, an actuating device for the revolving armature of said machine, and means operated by the said actuating device for closing the said battery-circuit, whereby the field-magnets are adapted to be energized upon and during the operation of the machine.

3. In a dynamo or magneto electric machine, the combination, substantially as hereinbefore specified, of the field or exciting electro-magnets thereof, a battery normally in open circuit therewith, a crank or like actuating device for operating the said machine, and a circuit-controller governing the circuit of said battery and actuated by the movement of the said crank device to close the same, and thereupon to energize the exciting-magnets while the machine is in operation.

4. The combination, with the field or exciting electro-magnets included in a local battery-circuit, of the revolving armature, and means for actuating the same in the magnetic field of the exciting electro-magnets, a shunt-circuit normally closed around said armature and circuit-changing devices, one in the shunt-circuit and one in the local battery-circuit controlled by the actuating mechanism, whereby the shunt-circuit is opened and the local battery-circuit closed when the armature is revolved, substantially as and for the purpose specified.

5. The combination, with the field-magnets, of the armature and means for actuating the same, a local circuit including said field-magnets and a circuit-opening device, whereby the local battery-circuit is opened when the armature is at rest, substantially as and for the purpose specified.

ELISHA GRAY.

Witnesses:
P. S. PETERS,
B. F. ROGERS.